United States Patent
Yonemura et al.

(10) Patent No.: US 9,274,004 B2
(45) Date of Patent: Mar. 1, 2016

(54) INFRARED SENSOR AND HEAT SENSING ELEMENT

(71) Applicant: SEIKO EPSON CORPORATION, Tokyo (JP)

(72) Inventors: Takayuki Yonemura, Suwa (JP); Takafumi Noda, Matsumoto (JP); Yasushi Tsuchiya, Fujimi-machi (JP); Yasuaki Hamada, Chino (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/223,683

(22) Filed: Mar. 24, 2014

(65) Prior Publication Data

US 2014/0284480 A1 Sep. 25, 2014

(30) Foreign Application Priority Data

Mar. 25, 2013 (JP) .................................. 2013-062266

(51) Int. Cl.
*G01J 5/00* (2006.01)
*G01J 5/10* (2006.01)
*G01J 5/04* (2006.01)
*G01J 5/34* (2006.01)

(52) U.S. Cl.
CPC .. *G01J 5/10* (2013.01); *G01J 5/046* (2013.01); *G01J 5/34* (2013.01)

(58) Field of Classification Search
CPC ......... G01J 1/44; G01J 5/0025; G01J 5/0806; G01J 5/22; G01J 5/34
See application file for complete search history.

(56) References Cited

U.S. PATENT DOCUMENTS

| | | | |
|---|---|---|---|
| 5,640,013 A * | 6/1997 | Ishikawa et al. | 250/338.4 |
| 5,801,383 A | 9/1998 | Wada et al. | |
| 5,888,659 A | 3/1999 | Summerfelt et al. | |
| 5,949,071 A | 9/1999 | Ruffner et al. | |
| 6,093,338 A | 7/2000 | Tani et al. | |
| 2005/0161604 A1* | 7/2005 | Baniecki et al. | 250/339.06 |
| 2009/0200471 A1 | 8/2009 | Kawakubo et al. | |
| 2011/0102514 A1 | 5/2011 | Yonemura | |
| 2011/0102517 A1 | 5/2011 | Yonemura et al. | |
| 2011/0102518 A1 | 5/2011 | Yonemura et al. | |
| 2012/0132808 A1 | 5/2012 | Yamamura | |

FOREIGN PATENT DOCUMENTS

| | | |
|---|---|---|
| EP | 0435397 | 7/1991 |
| JP | 08-172224 | 7/1996 |
| JP | 08-253324 | 10/1996 |
| JP | 09-126895 | 5/1997 |
| JP | 09-257565 | 10/1997 |

(Continued)

OTHER PUBLICATIONS

Huang et al., "Optical and electrical properties of multiferroic bismuth ferrite thin films fabricated by sol-gel techniques," 2010, Materials Letters, vol. 64, pp. 2233-2235.*

(Continued)

*Primary Examiner* — Kiho Kim
(74) *Attorney, Agent, or Firm* — Workman Nydegger

(57) ABSTRACT

An infrared sensor includes a heat sensing element, the heat sensing element includes a first electrode, a second electrode and a dielectric film formed between the first electrode and the second electrode. The heat sensing element senses heat based on a change of a resistance value. The dielectric film includes at least Bi and Fe.

17 Claims, 8 Drawing Sheets

(56) References Cited

FOREIGN PATENT DOCUMENTS

| | | |
|---|---|---|
| JP | 2003-530538 | 2/1999 |
| JP | 2009-068863 | 4/2009 |
| JP | 2011-093295 | 5/2011 |
| JP | 2011-097002 | 5/2011 |
| JP | 2011-116111 | 6/2011 |
| JP | 2012-117847 | 6/2012 |

OTHER PUBLICATIONS

J. Lee, "Growth of multiferroic oxides by molecular-beam epitaxy," 2011, Ph.D. Dissertation, The Pennsylvania State University.*
European Search Report for Application No. 14160682.2 dated Jun. 12, 2014.

* cited by examiner

INFRARED SENSOR AND HEAT SENSING ELEMENT

BACKGROUND

1. Technical Field

The present invention relates to an infrared sensor and a heat sensing element.

2. Related Art

An infrared sensor is divided into a quantum type and a heat type by a detection principle. The heat type of the two types attracts attention from the viewpoint of exclusion of cooling for noise measures. For example, a bolometer type which is one of the heat types detects infrared light using temperature dependence of a resistance value, and is widely used in an uncooled type of infrared element. Such a bolometer type of infrared sensor includes a heat sensing element.

Recently, from the viewpoint of high sensitivity, a high response characteristic, or the like, the size of one pixel of a bolometer material in the infrared sensor has been considerably small, and the material has been desired to be formed as a thin film. Therefore, as the bolometer material, an infrared sensor which uses a vanadium oxide thin film has been proposed (refer to JP-A-9-257565).

However, there is a problem in that when a vanadium oxide thin film described in JP-A-9-257565 is used, it is difficult to realize good sensitivity of an infrared sensor.

SUMMARY

An advantage of some aspects of the invention is that a heat sensing element and an infrared sensor whose sensitivity can be improved even when being manufactured as a thin film, are provided.

According to an aspect of the invention there is provided an infrared sensor includes a heat sensing element, the heat sensing element includes a first electrode, a second electrode and a dielectric film formed between the first electrode and the second electrode. The heat sensing element senses heat based on a change of a resistance value. The dielectric film includes at least Bi and Fe.

In the infrared sensor, the dielectric film which includes at least Bi and Fe may be material which has a great temperature dependence of the resistance value, and thus the sensitivity of the infrared sensor can be improved.

It is preferable that an absolute value of a temperature coefficient of resistance of the dielectric film be equal to or greater than 4%. According to this, by using the material which has the great temperature dependence of the resistance value, the sensitivity of the infrared sensor can be improved.

It is preferable that activation energy of the dielectric film be equal to or more than 0.39 eV. According to this, by using the material which has the great temperature dependence of the resistance value, detection sensitivity of the resistance value can be improved, and the sensitivity of the infrared sensor can be improved.

It is preferable that the dielectric film be a composite oxide that has a perovskite structure, and include Mn in a B-site element. According to this, an amount of current per unit time can be increased by increasing a leak current. In addition, an influence due to an increase of an insulation property in the heat sensing element can be suppressed, the detection sensitivity of the resistance value can be improved, and the sensitivity of the infrared sensor can be improved.

It is preferable that material amount ratio of the Mn included in the B-site element be equal to or more than 2 mol %. According to this, by increasing the amount of current per unit time, the detection sensitivity of the resistance value can be improved, and the sensitivity of the infrared sensor can be further improved.

It is preferable that Ti be included in the B-site element. According to this, by adjusting an elemental material amount ratio Mn/Ti of Mn and Ti which are included in the B-site element, and by increasing the amount of current per unit time, the detection sensitivity of the resistance value can be improved, and the infrared sensor with high sensitivity can be realized.

It is preferable that an elemental material amount ratio Mn/Ti of the Mn and the Ti which are included in the B-site element, be equal to or more than 1.5. According to this, by increasing the amount of current per unit time, the detection sensitivity of the resistance value can be further improved, and the sensitivity of the infrared sensor can be further improved.

It is preferable that a density of a current flowing in the heat sensing element be equal to or more than $2.4 \times 10^{-6}$ Acm$^{-2}$ and equal to or less than $1.1 \times 10^{-2}$ Acm$^{-2}$. According to this, by using the material which has a great current density, the detection sensitivity of the resistance value can be improved, and the sensitivity of the infrared sensor can be further improved.

According to another aspect of the invention, there is provided A heat sensing element includes a first electrode, a second electrode, and a dielectric film formed between the first electrode and the second electrode. The heat sensing element senses heat based on a change of a resistance value. The dielectric film includes at least Bi and Fe.

In the heat sensing element, the dielectric film which includes at least Bi and Fe may be a material which has a great temperature dependence of the resistance value, and thus the sensitivity of the infrared sensor can be improved.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, based on FIGS. 1A to 8, an embodiment according to the invention will be described in detail. Such an embodiment illustrates an aspect of the invention, but does not limit the invention, and can be arbitrarily modified within a scope of the invention. In the configuration members of FIGS. 1A to 8, the same symbols reference the same members, and description thereof will be appropriately omitted.

Figure 1A:
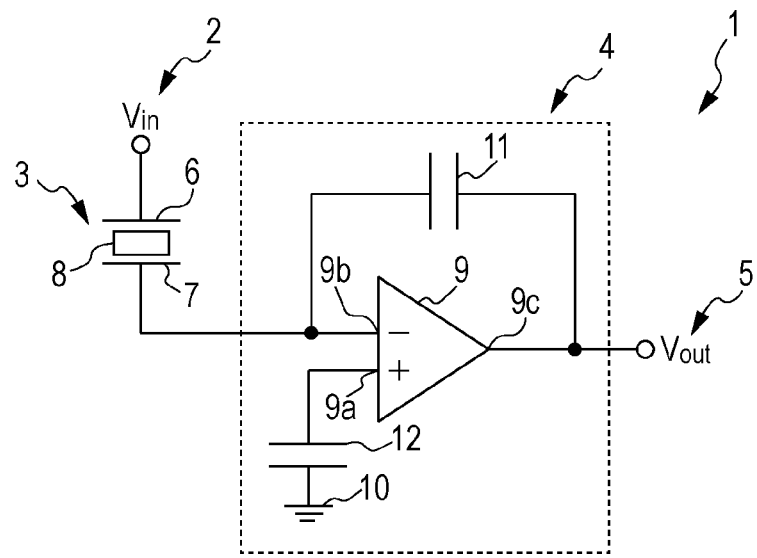
FIGS. 1A and 1B are diagrams illustrating a schematic configuration of an infrared sensor according to the present embodiment.
Figure 1B:
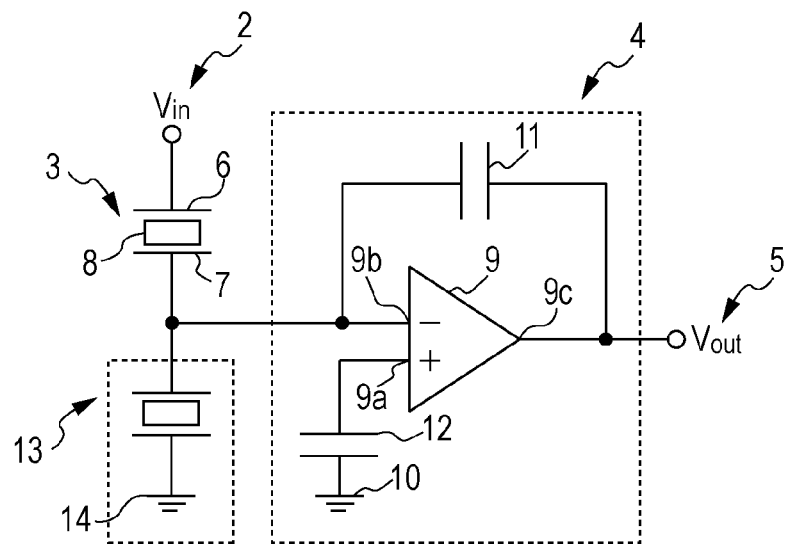

FIGS. 1A and 1B are diagrams illustrating a schematic configuration of an infrared sensor according to an embodiment of the invention. FIG. 1A is a circuit diagram configured from a single element, and FIG. 1B is a circuit diagram using a reference element.

As illustrated in FIG. 1A, the infrared sensor 1 includes an input power supply 2 which applies a voltage, a heat sensing element 3, an integration circuit 4, and a voltage detection device 5 which detects a signal of the integration circuit. Meanwhile, although omitted in FIGS. 1A and 1B, a configuration of a window material, a cap or the like which packages the above members is not limited.

The heat sensing element 3 is an element having a property in which a resistance value thereof is changed by a temperature. The heat sensing element 3 includes a first electrode 6, a second electrode 7, and a dielectric film 8 which is formed between the first electrode 6 and the second electrode 7. In the present embodiment, the first electrode 6 is connected to the input power supply 2, and the second electrode 7 is connected to an input side of the integration circuit 4.

The integration circuit 4 includes an operational amplifier 9. The operational amplifier 9 includes a positive input terminal 9a, a negative input terminal 9b and an output terminal 9c. The positive input terminal 9a is connected to a ground 10, the negative input terminal 9b is connected to the second electrode 7, and the output terminal 9c is connected to the voltage detection device 5. In addition, a capacitor 11 is formed between the negative input terminal 9b and the output terminal 9c of the operational amplifier 9, and electric charges which are output from the operational amplifier 9 are stored therein. Meanwhile, as illustrated, the positive input terminal 9a may be grounded through a capacitor 12.

In the infrared sensor 1 having such a configuration, the temperature of the heat sensing element 3 rises by absorbing heat energy of infrared light, and the resistance value thereof is changed. A current which flows when the input power supply 2 applies a voltage, is converted into a voltage signal by the capacitor 11 and the operational amplifier 9 and then, amplified, the amplified voltage is detected by the voltage detection device 5, and thereby a change of the resistance value is detected.

The configuration of the infrared sensor illustrated in FIG. 1B includes a reference element 13, in addition to the configuration of FIG. 1A. For example, the reference element 13 uses the same heat sensing element as the heat sensing element 3, and can be configured by installing a shield plate on an incident plane of the infrared light. The reference element 13 has one electrode which is connected to a ground 14 and the other electrode which is connected to the second electrode 7. That is, in FIG. 1B, the reference element 13 and the second electrode 7 are serially connected to each other, and connected to the negative input terminal 9b of the operational amplifier 9 through a common connection line therebetween.

A function of the infrared sensor which includes the reference element 13 is as follows. That is, even when an error, which is caused by an installation environment, time degradation or the like of the infrared sensor, occurs in the current from the heat sensing element 3, such an error can occur similarly even in the current from the reference element 13 configured by using the same element as the heat sensing element 3, for example. Thus, the error of the current occurring similarly in both the elements can be cancelled during integration, and the error can be prevented from occurring in an output voltage. Accordingly, the change of the resistance value can be correctly detected, and sensitivity of the infrared sensor can be improved.

The first and second electrodes 6 and 7 of the heat sensing element 3 can be made by using a material having a conductivity, and specifically, Pt, Ti, Cr, Al, Au, Cu or the like can be used. Such first electrode 6 and second electrode 7 are layer shapes or thin film shapes. Meanwhile, such shapes, materials, thicknesses or the like can be modified as long as the gist of the invention is not modified.

Here, the dielectric film 8 of the heat sensing element 3 includes at least Bi and Fe. In the embodiment of the invention, the dielectric film 8 is configured as a composite oxide having a perovskite structure which includes Bi as an A-site element and Fe as a B-site element. The composite oxide is lead-free and denoted by the composition formula $BiFeO_3$. The composite oxide includes solid solution (mixed crystal ceramics) which includes ceramics abbreviated as BFO ceramics.

Such a dielectric film 8 is a material with a great temperature dependence of the resistance value. Thus, a temperature rise of the heat sensing element 3 which absorbs the heat energy of the infrared light can be accurately detected based on the resistance value, and the sensitivity of the infrared sensor 1 can be improved.

Here, it is preferable that the dielectric film 8 has an absolute value of a temperature coefficient of resistance (hereinafter, abbreviated as |TCR|) which is equal to or greater than 4%. This is because if the |TCR| is less than 4%, the temperature dependence of the resistance value becomes small and it is difficult to configure the infrared sensor with higher sensitivity than that in the related art. The |TCR| is denoted by the following formula (1). It is found that the |TCR| is a ratio of a resistance change to a temperature change, from the formula (1). Meanwhile, in the formula (1), R denotes the resistance value, and T denotes the temperature.

$$|TCR|=|(1/R)(dR/dT)| \tag{1}$$

In addition, it is preferable that the dielectric film 8 has activation energy $E_a$ which is equal to or greater than 0.39 eV. This is because if the activation energy $E_a$ is less than 0.39 eV, the temperature dependence of the resistance value becomes small and it is difficult to configure the infrared sensor with a higher sensitivity than that in the related art. The activation energy $E_a$ is denoted by the following formulas (2) and (3). It is found that the activation energy $E_a$ is proportional to a natural logarithm ln (J) of an amount of current per unit time, from the formulas (2) and (3). Meanwhile, in the formulas (2) and (3), T denotes that the temperature and A and $k_B$ are integers.

$$J = A \times \exp(-E_a/k_B T) \tag{2}$$

$$\ln(J) = -E_a/k_B T + \ln(A) \tag{3}$$

In this way, the dielectric film 8 is a material with a large temperature dependence of the resistance value, and can improve the sensitivity of the infrared sensor 1. Such a dielectric film 8 includes the configurations represented in the below-described composition formulas (4) to (6), for example.

$$(Bi_{1-x}La_x)(Fe_{1-y}Mn_y)O_3 \tag{4}$$

$$(Bi_{1-x}La_x)(Fe_{1-y-z}Mn_yTi_z)O_3 \tag{5}$$

$$x[Bi(Fe_{(1-y)}Mn_y)O_3]-(1-x)[BaTiO_3] \tag{6}$$

The dielectric films 8 represented in the above-described formulas (4) to (6) are all configured as the composite oxide of $ABO_3$ type which has the perovskite structure. The A-site has oxygen of 12-coordination, and the B-site forms an octahedron of oxygen of 6-coordination.

For example, the dielectric film represented in the above-described formula (4) includes Bi, La, Fe and Mn, and is the composite oxide which includes bismuth ferrate ($BiFeO_3$), lanthanum ferrate ($LaFeO_3$), and manganese bismuth ($BiMnO_3$).

In addition, the dielectric film represented in the above-described formula (5) includes Bi, La, Fe, Mn and Ti, and is the composite oxide in which a portion of Fe represented in the above-described formula (4) is substituted with Ti.

In addition, the dielectric film represented in the above-described formula (6) includes Bi, Fe, Ba, Mn and Ti, and is denoted as (Bi, Ba) (Fe, Ti, Mn)$O_3$, and denoted as solid solution which has ferrate manganese bismuth (Bi(Fe, Mn)$O_3$) and barium titanate ($BaTiO_3$).

Meanwhile, in the formulas (4) to (6), all of the x, the y and the z can take values less than 1 and greater than 0. As such values, charge-in quantity of raw materials may be expressed when the dielectric film is formed, and the composition of the dielectric film may be expressed after the dielectric film is formed. In addition, the dielectric film is not limited to a compound denoted by the composition formula $BiFeO_3$, but may include another compound as long as the gist of the invention is not modified, and the bismuth ferrate may include a different metal. A portion of the Bi in the bismuth ferrate may be substituted with one or more metals such as Ce or Sm, and a portion of the Fe in the bismuth ferrate may be substituted with one or more metals such as Al, Co, or Cr. In various analyses, each composite oxide includes a case where elements other than Bi, La, Ba, Fe, Mn, Ti and $O_2$ cannot be detected, a case where a trace amount is recognized, and a case where there is a deviation from a composition of a stoichiometry due to loss and surplus.

A basic function of the infrared sensor 1 which includes such a dielectric film 8 is as follows. That is, when the infrared light is incident from outside, the temperature of the heat sensing element 3 rises by absorbing the heat energy, and the resistance value of the heat sensing element 3 is changed. The change of the resistance value is detected when the current flowing when the voltage is applied by the input power supply 2 is converted into a voltage signal by the integration circuit 4 and the voltage is detected by the voltage detection device 5. That is, the temperature dependence depends on the change of the resistance value of the heat sensing element 3, and by using this, the infrared light is detected. As represented in the exemplary embodiment described later, according to the infrared sensor of the embodiment of the invention, it is possible to realize higher sensitivity even than that in a comparative example which is said to have better sensitivity than that in the related art.

Figure 2:
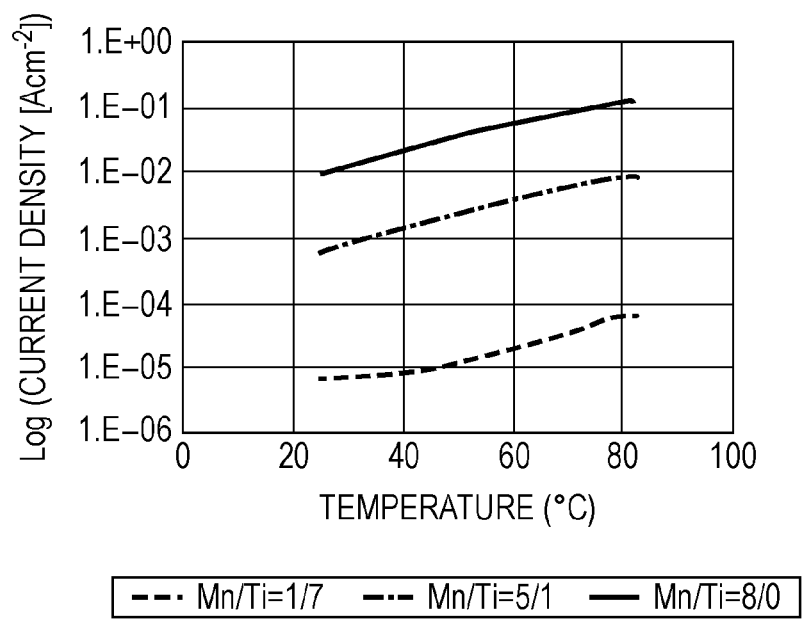
FIG. 2 is a diagram illustrating a relationship between an amount of Mn and a current density.

It is preferable that the above-described infrared sensor 1 be the composite oxide in which the dielectric film 8 has the perovskite structure, and Mn be included in the B-site element. According to this, a leak current from the heat sensing element 3 is increased, and thereby a current density can be increased. FIG. 2 illustrates a relationship between an Mn amount of the B-site element and the current density. As illustrated in FIG. 2, by including Mn in the B-site element, the density of the current flowing in the heat sensing element can be increased, and detection accuracy of the resistance value can be improved. In addition, because of an increase of an insulation property due to an increase of the activation energy, the current density can also be prevented from decreasing. Thus, the sensitivity of the infrared sensor 1 can be improved.

Specifically, it is preferable that the infrared sensor 1 has an amount of material of Mn, which is included in the B-site element, equal to or more than 2 mol %. According to this, detection sensitivity of the resistance value is improved by increasing the amount of current per unit time, and thereby the sensitivity of the infrared sensor can be more improved.

In addition, it is preferable that the infrared sensor 1 has the B-site element which includes Mn and Ti. According to this, the detection sensitivity of the resistance value is improved by increasing the amount of current per unit time, and thereby the infrared sensor with high sensitivity can be easily realized.

Specifically, it is preferable that the infrared sensor 1 has an elemental material amount ratio Mn/Ti, which is equal to or more than 1.5, of Mn and Ti which are included in the B-site element. According to this, the detection sensitivity of the resistance value is further improved by increasing the amount of current per unit time, and thereby the sensitivity of the infrared sensor can be still further improved.

In addition, in the infrared sensor 1, it is preferable that the thickness of the dielectric film 8 is 50 nm to 600 nm and it is more preferable that the thickness of the dielectric film 8 is 150 nm to 400 nm. The reason is that it is not preferable that if the thickness of the dielectric film is thinner than the above-described range, forming a uniform film is difficult, and that if the thickness of the dielectric film is thicker than the above-described range, heat capacity is increased, and thereby the sensitivity and response speed of the infrared sensor is influenced thereby.

In addition, for example, the dielectric film 8 of the infrared sensor 1 can be manufactured as follows.

Coating and drying is performed for a solution obtained by dissolving and dispersing a metal complex in a solvent, a bolometer material formed from metal oxide is obtained by further firing at a high temperature, and the dielectric film 8 is formed by using a chemical solution deposition (CSD) method. Meanwhile, a method of manufacturing the dielectric film is not limited to the CSD method, and may use, for example, a sol-gel method, a laser ablation method, a sputtering method, a pulse laser deposition method (PLD method), a CVD method, an aerosol deposition method or the like.

For example, a precursor film is formed by coating sol or CSD solution (precursor solution) which contains the metal complex, specifically, the metal complex which contains Bi, La, Fe, Mn, Ti and the like, in a proportion to obtain an intended composition ratio, on the first electrode 6 by using a spin coat method (coating step).

The precursor solution for coating is formed by mixing the metal complex which respectively contains Bi, La, Fe, Mn, Ti and the like so as to be a desired material amount ratio with each metal, and then, by dissolving or dispersing the mixture using an organic solvent such as carboxylic acid. As the metal complex which respectively contains Bi, La, Fe, Mn, Ti and the like, for example, metal alkoxide, organic acid salt, and β diketone complex can be used. As the metal complex which contains Bi, for example, acetic acid bismuth, propionic acid bismuth, and two-ethylhexanoic acid bismuth can be used. As the metal complex which contains La, acetic acid lanthanum, propionic acid lanthanum, two-ethylhexanoic acid lanthanum and the like can be used. As the metal complex which contains Fe, for example, acetic acid iron, propionic acid iron, and two-ethylhexanoic acid iron can be used. As the metal complex which contains Mn, for example, acetic acid manganese, propionic acid manganese, and two-ethylhexanoic acid manganese can be used. As the metal complex which contains Ti, for example, tetraisopropoxytitanium, propionic acid titanium, two-ethylhexanoic acid titanium can be used.

Next, the precursor film is heated to a predetermined temperature and dried for a certain time (drying step). Next, the dried precursor film is heated to the predetermined temperature and then, retained for the certain time, and thereby degreasing is accomplished (degreasing step). In addition, the degreasing referred to here is to divide organic components contained in the precursor film into, for example, $NO_2$, $CO_2$, $H_2O$ or the like.

Next, the precursor film is heated to the predetermined temperature such as approximately 600° C. to 750° C., and retained for the certain time, and thereby crystallization is accomplished, and accordingly, the dielectric film is formed (firing step). In addition, as a heating device which is used in the drying step, the degreasing step and the firing step, a rapid thermal annealing (RTA) device which performs the heating using radiation of an infrared lamp, a hot plate or the like can be used.

In addition, by repeating a plurality of times the coating step, the drying step and the degreasing step, or the coating step, the drying step, the degreasing step and the firing step which are described above, in accordance with a desired film thickness, a plurality of dielectric film layers may be formed.

After the dielectric film 8 is formed, the second electrode 7 formed from a metal such as Pt is stacked on the dielectric film 8, thereby configuring the heat sensing element 3.

Figure 3A:
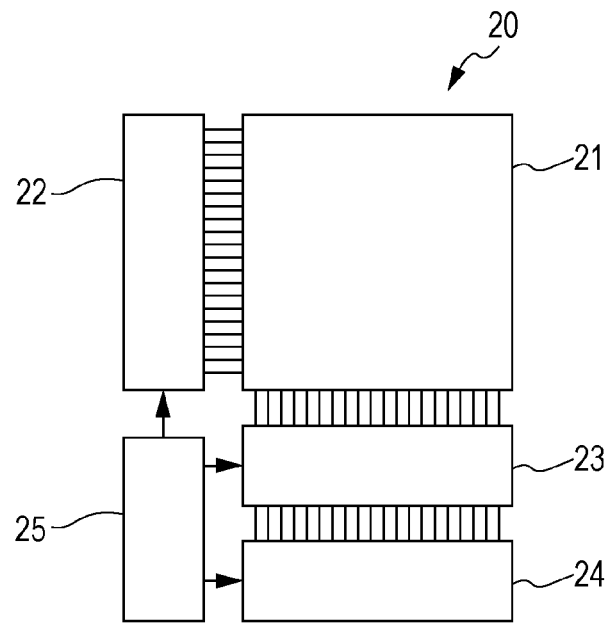
FIGS. 3A and 3B are configuration diagrams of a sensor device using a heat sensing element according to the present embodiment.
Figure 3B:
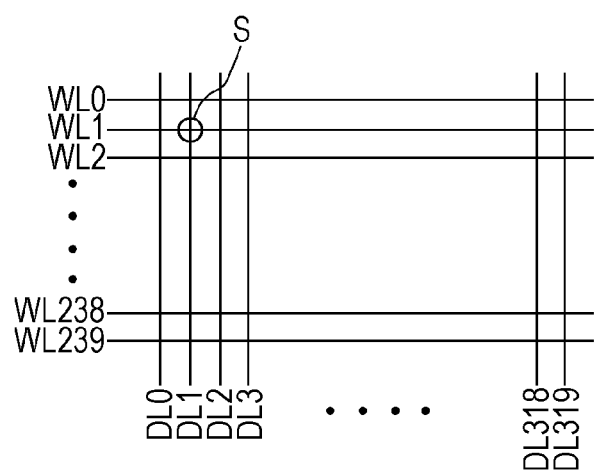
Figure 4:
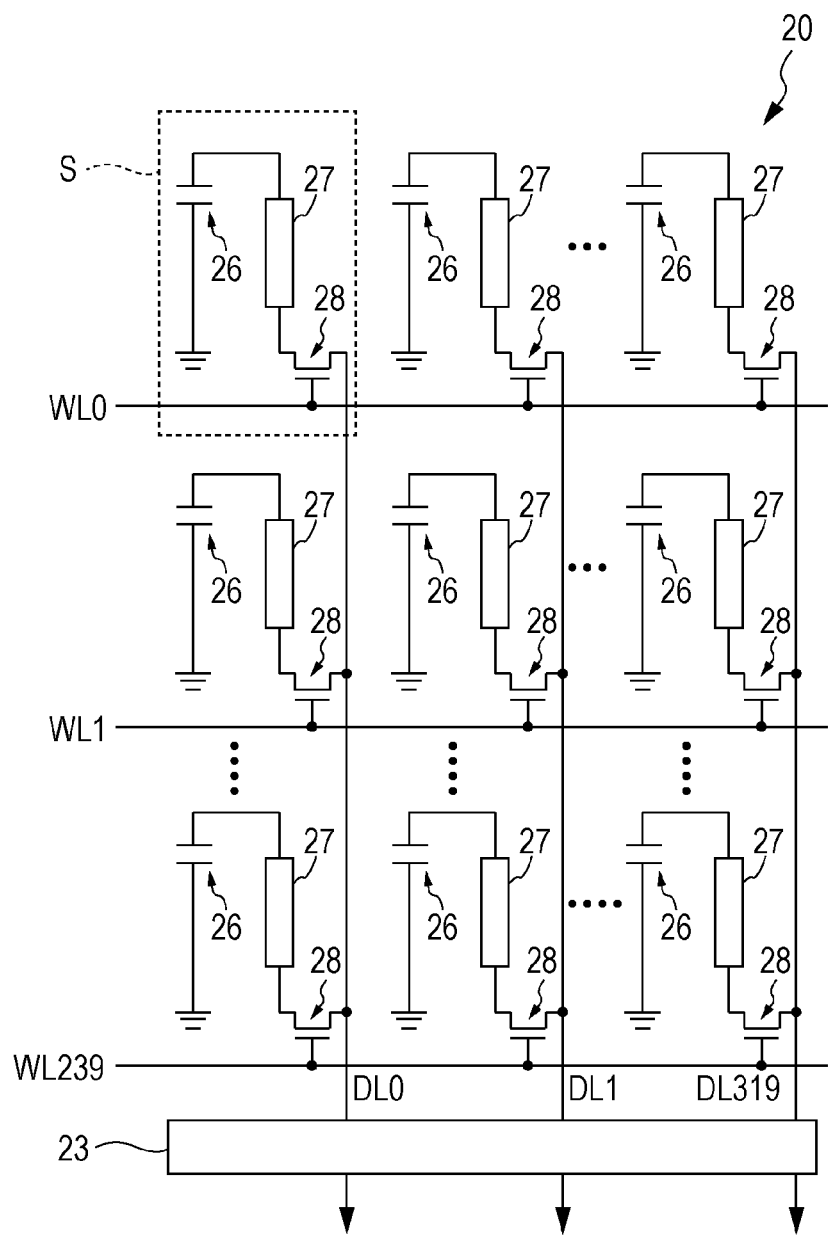
FIG. 4 is a configuration diagram of a sensor device using a heat sensing element according to the present embodiment.

Next, using FIGS. 3A, 3B and 4, a sensor device which uses the heat sensing element 3 will be described. FIGS. 3A, 3B and 4 illustrate configuration examples of the sensor device 20 which uses the heat sensing element 3. In addition, the sensor device 20 which uses the heat sensing element is not limited to the configurations illustrated in FIGS. 3A, 3B and 4, but various modifications, such as omitting a portion of configuration elements thereof, substituting with a different configuration element, or adding a different configuration element, can be performed.

As illustrated in FIGS. 3A and 3B, the sensor device 20 includes a sensor array 21, a row selection circuit (row driver) 22, and a read circuit 23. In addition, the sensor device 20 can include an A/D conversion unit 24 and a control circuit 25. By using the sensor device 20, an infrared camera or the like which is used in, for example, a night vision apparatus or the like, can be realized.

In the sensor array 21, a plurality of sensor cells are arranged (disposed). In addition, a plurality of row lines (word lines, scan lines) and a plurality of column lines (data lines) are formed. Meanwhile, the number of column lines may be one. For example, when there is only one row line, a plurality of sensor cells are arranged in a direction (horizontal direction) along the row line in FIG. 3A. On the other hand, when there is only one column line, a plurality of sensor cells are arranged in a direction (vertical direction) along the column line.

Each sensor cell of the sensor array 21 is disposed (formed) in a place corresponding to an intersection position of each row line and each column line. For example, the sensor cell S in FIG. 3B is disposed in a place corresponding to an intersection position of a row line WL1 and a column line DL1. The other sensor cells are the same. Although not illustrated in FIGS. 3A and 3B, the heat sensing element according to the embodiment of the invention is formed in the sensor cell S.

The row selection circuit 22 is connected to one row line or a plurality of row lines. Then, the row selection circuit 22 performs an operation of selecting each row line. For example, in the sensor array 21 of QVGA (320×240 pixels) illustrated in FIG. 3B, an operation of sequentially selecting (scanning) the row lines WL0, WL1, WL2, . . . WL239 is performed. That is, a signal (word selection signal) which selects such row lines is output to the sensor array 21.

The read circuit 23 is connected to a plurality of column lines. Then, the read circuit 23 performs an operation of reading each column line. For example, in the sensor array of QVGA (320×240 pixels), an operation of reading a detection signal from the column lines DL0, DL1, DL2, . . . DL319 is performed. For example, although not illustrated in the read circuit 23, each amplification circuit corresponding to each column line of a plurality of column lines is formed. Then, each amplification circuit performs an amplification process of a signal of a corresponding column line.

The A/D conversion unit 24 A/D converts a detection voltage obtained in the read circuit 23 into digital data. Then, the A/D conversion unit 24 outputs the digital data DOUT after an A/D conversion. Specifically, in the A/D conversion unit 24, each A/D converter corresponding to each column line of a plurality of column lines is formed. Then, each A/D converter A/D converts the detection voltage obtained by the read circuit 23 in the corresponding column line. Meanwhile, one A/D converter corresponding to a plurality of column lines is formed, and by using the one A/D converter, the detection voltages of the plurality of column lines may be A/D converted in time division. In addition, without an amplification circuit of the read circuit 23 being formed, the signal of each column line may be directly input to each A/D converter of the A/D conversion unit 24.

The control circuit 25 generates various control signals, and outputs the various signals to the row selection circuit 22, the read circuit 23 and the A/D conversion unit 24. For example, the control circuit 25 generates and outputs signals or the like which control timing of each circuit.

FIG. 4 illustrates a detailed configuration of the sensor device 20.

Each sensor cell S includes a heat sensing element 26, an integration circuit 27, and a read-purpose transistor (FET) 28 which are explained using FIGS. 1A and 1B. Then, a source of the read-purpose transistor 28 is connected to a current output side of the heat sensing element 26 through the integration circuit 27, a drain thereof is connected to the column lines DL0, DL1, . . . DL319, and in addition, a gate thereof is connected to the row lines WL0, WL1, . . . WL239.

Reading of the detection signals from each sensor cell is performed as follows. For example, when the row line WL0 is selected, a voltage is applied to the gate of the read-purpose transistor 28 whose gate is connected to the row line WL0, and a channel is formed between the source and the drain, thereby turning on the read-purpose transistor. Then, one sensor cell or the plurality of sensor cells which corresponds to the row line WL0 is respectively electrically connected to the corresponding column lines DL (DL0 to DL319). At this time, the row lines (WL1 to WL239) other than the row line WL0 are not selected.

In this way, the detection signal from the one sensor cell or the plurality of sensor cells which corresponds to the row line WL0 is read for each column. Thereafter, the other row lines WL (WL1 to WL239) are sequentially selected, and a detection signal from each sensor cell is read in the same manner as in the above-description.

EXAMPLE

Hereinafter, although examples are described, the invention is not limited to the following examples.

Examples 1 to 2

Solutions 1 to 2 are produced by mixing various solutions of Bi, La, Fe, and Mn, in which the propionic acid is used as a ligand and a solvent, in a material amount ratio of 75:25: 99:1 and 75:25:97:3, respectively.

Next, the respective solutions 1 to 2 are coated on a Pt/IrO$_2$/Ir/TiAlN/SiO$_2$/Si substrate at 1,500 rpm using the spin coat method, and after being heated at 180° C. for two minutes, the substrate is heated at 350° C. for three minutes. After these steps are repeated four times, the substrate is heated at 650° C. for five minutes using the RTA. By repeating this series of steps two times, a BLFM thin film of eight total layers is produced. Meanwhile, the TiAlN is used as an adhesion layer which improves an adhesion between the BLFM thin film and a base.

Next, the heat sensing element according to the examples 1 to 2 is produced, by producing a Pt film of 100 nm on a BFM-BT thin film using the sputtering method.

Examples 3 to 6

The heat sensing element according to examples 3 to 6 is produced, by using the same processes as in the example 1, except that the solutions are Bi, La, Fe, Mn and Ti, and the respective material amount ratios are 85:15:96:3:1, 80:20:96:3:1, 75:25:96:3:1, and 70:30:96:3:1.

Example 7

The heat sensing element according to the example 7 is produced, by using the same solutions and processes as in the example 2, except that the substrate is manufactured from Pt/Ti/ZrO$_2$/SiO$_2$/Si.

Examples 8 to 10

Solutions 8 to 10 are produced by mixing various solutions of Bi, La, Fe, Mn and Ti, in which 2-ethylhexanoic acid is used as the ligand and n-octane is used in the solvent, in a material amount ratio of 85:15:92:8:0, 85:15:94:5:1, and 85:15:92:1:7, respectively.

Next, the produced solutions 8 to 10 are respectively coated on a Pt/TiO$_2$/SiO$_2$/Si substrate at 2,000 rpm using the spin coat method, and after being heated at 150° C. for two minutes, the substrate is heated at 350° C. for two minutes. After these steps are repeated four times, the substrate is heated at 650° C. for five minutes using the RTA, thereby producing the BLFMT thin film of four total layers.

Next, the heat sensing element according to the examples 8 to 10 is produced, by producing the Pt film of 100 nm on the BLFMT thin film using the sputtering method.

Example 11

Solution 11 is produced by mixing various solutions of Bi, Fe, Mn, Ba and Ti, in which the 2-ethylhexanoic acid is used as the ligand and the n-octane is used in the solvent, in a material amount ratio of 75:71.5:3.5:25:25.

Next, the produced solution 11 is coated on a LNO/Pt/ZrO$_2$/SiO$_2$/Si substrate at 3000 rpm using the spin coat method, and after being heated at 180° C. for three minutes, the substrate is heated at 350° C. for three minutes. After these steps are repeated two times, the substrate is heated at 650° C. for five minutes using the RTA. By repeating this series of steps six times, a BFM-BT thin film of twelve total layers is produced.

Next, the heat sensing element according to the example 11 is produced, by producing an Ir film of 50 nm on the BFM-BT thin film using the sputtering method.

Comparative Example

The heat sensing element according to a comparative example is produced by the same processes as in the example 8, except that only Ti is used for the solution.

X-Ray Diffraction Measurement

In the dielectric film of the heat sensing element according to the examples 1 to 11, a structure and an orientation were measured using "D8 Discover" manufactured by Bruker. CuKα was used as a line source, and GADDS (two dimensional detector) was used as a detector. As the result, all samples have an ABO$_3$ structure and abnormality or the like was not observed.

Orientation Property Measurement

Figure 5:
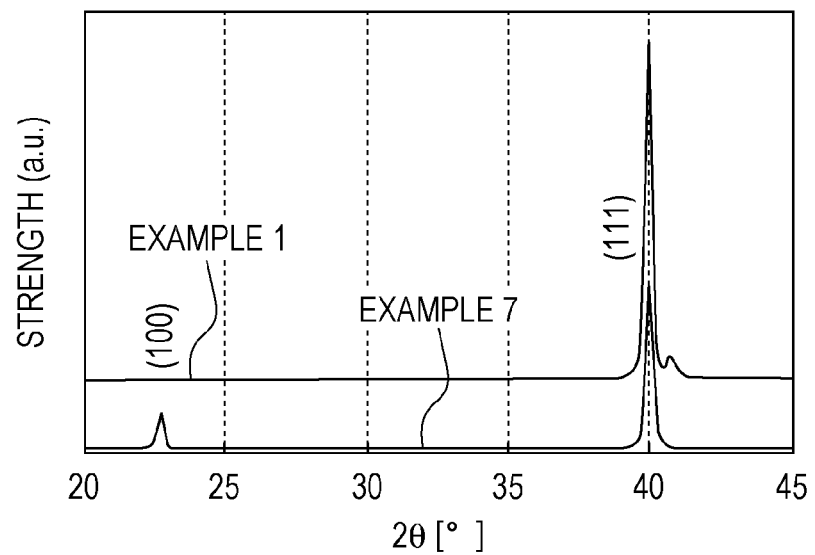
FIG. 5 is a diagram illustrating an XRD measurement result with respect to examples 1 and 7.

In the dielectric film of the heat sensing element according to the examples 1 to 11, an orientation property was measured. In FIG. 5, an XRD measurement result of the heat sensing element according to the examples 1 and 7 is illustrated. As illustrated in FIG. 5, it is confirmed that the example 1 is oriented to (111) and the example 7 is oriented to (100).

Electrical Conductivity Measurement

In the heat sensing element according to the examples 1 to 11, an electrical conductivity was measured in the air using "4140B" manufactured by Hewlett Packard. A temperature control was performed using the hot plate, and a temperature fluctuation range is equal to or less than ±1° C. Additionally, when measuring, a prober shielded from light was used, and influence of photovoltaic power or the like was eliminated. The TCRs of the examples 1 to 11 and the comparative example are represented in Table 1. In Table 1, it is found that a high TCR does not depend on the orientation in the examples 1 and 7, does not depend on an amount of La in the examples 3 to 6, and does not depend on presence or absence of Ti in the examples 1 and 5.

Figure 6:
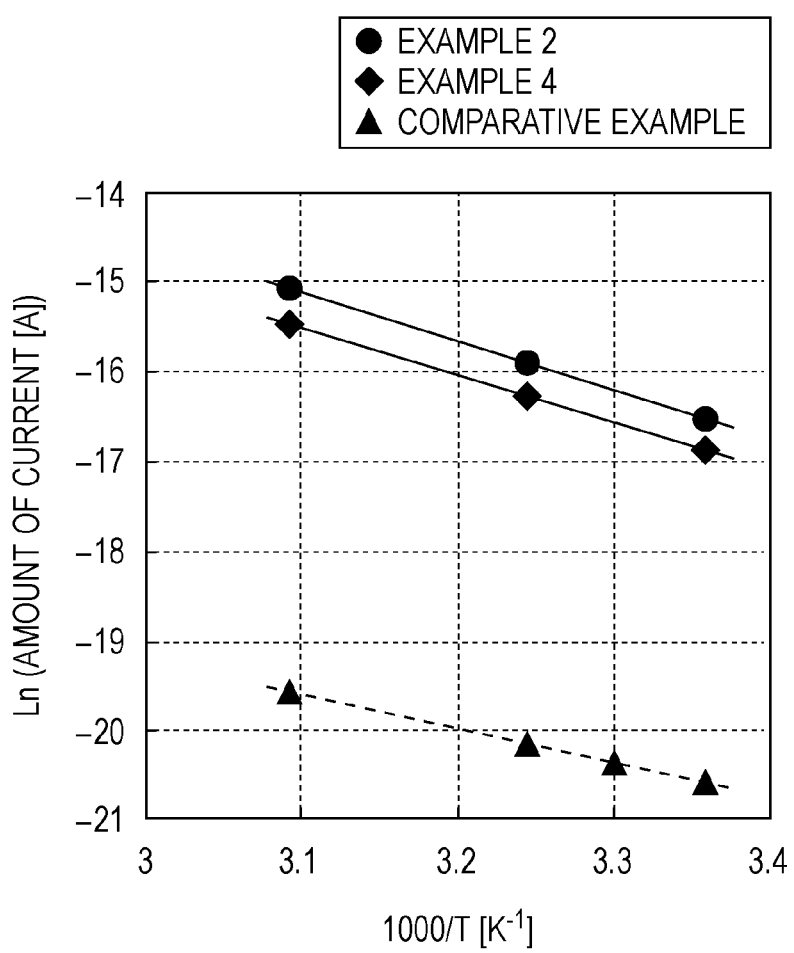
FIG. 6 is a diagram illustrating Arrhenius plots of examples 2 and 4 and a comparative example.

In addition, FIG. 6 illustrates Arrhenius plots of the examples 2 and 4 and the comparative example. As illustrated in FIG. 6, the Arrhenius plots of the examples 2 and 4 and the comparative example are straight lines. Generally, if mechanisms of electrical conduction are the same, the Arrhenius plots are straight lines, and thus, a change of a conduction mechanism within a measurement temperature range is not observed. Consequently, it is possible to determine the activation energy from a slope of the Arrhenius plot. Table 1 represents the activation energy of the examples 1 to 11 and the comparative example.

TABLE 1

| | Material | Base substrate | Material amount ratio | $J_{1V}$ [Acm$^{-2}$] | TCR [%] | $E_a$ (eV) |
|---|---|---|---|---|---|---|
| Example 1 | BLFM | Pt/IrO$_2$/Ir/TiAlN/SiO$_2$/S | 75:25:99:1 | 4.4 × 10$^{-5}$ | −5.5 | 0.46 |
| Example 2 | BLFM | Pt/IrO$_2$/Ir/TiAlN/SiO$_2$/S | 75:25:97:3 | 5.0 × 10$^{-5}$ | −5.1 | 0.45 |
| Example 3 | BLFMT | Pt/IrO$_2$/Ir/TiAlN/SiO$_2$/S | 85:15:96:3:1 | 4.6 × 10$^{-5}$ | −5.0 | 0.45 |
| Example 4 | BLFMT | Pt/IrO$_2$/Ir/TiAlN/SiO$_2$/Si | 80:20:96:3:1 | 3.2 × 10$^{-5}$ | −5.6 | 0.46 |
| Example 5 | BLFMT | Pt/IrO$_2$/Ir/TiAlN/SiO$_2$/Si | 75:25:96:3:1 | 2.8 × 10$^{-5}$ | −5.3 | 0.48 |

TABLE 1-continued

| | Material | Base substrate | Material amount ratio | $J_{1V}$ [Acm$^{-2}$] | TCR [%] | $E_a$ (eV) |
|---|---|---|---|---|---|---|
| Example 6 | BLFMT | Pt/IrO$_2$/Ir/TiAlN/SiO$_2$/Si | 70:30:96:3:1 | $2.3 \times 10^{-5}$ | −5.5 | 0.46 |
| Example 7 | BLFM | Pt/Ti/ZrO$_2$/SiO$_2$/Si | 75:25:97:3 | $2.3 \times 10^{-5}$ | −5.3 | 0.47 |
| Example 8 | BLFM | Pt/TiO$_2$/SiO$_2$/Si | 85:15:92:8 | $1.1 \times 10^{-2}$ | −4.8 | 0.43 |
| Example 9 | BLFMT | Pt/TiO$_2$/SiO$_2$/Si | 85:15:94:5:1 | $6.4 \times 10^{-4}$ | −5.1 | 0.46 |
| Example 10 | BLFMT | Pt/TiO$_2$/SiO$_2$/Si | 85:15:92:1:7 | $7.6 \times 10^{-6}$ | −4.3 | 0.39 |
| Example 11 | BFM-BT | LNO/Pt/ZrO$_2$/SiO$_2$/Si | 75:71.5:3.5:25:25 | $2.4 \times 10^{-6}$ | −6.5 | 0.67 |
| Comparative example | TiO$_2$ | Pt/TiO$_2$/SiO$_2$/Si | — | $5.6 \times 10^{-7}$ | −3.9 | 0.33 |

As represented in Table 1, in the comparative example, |TCR|=3.9%. in contrast, in the examples 1 to 11, |TCR|=4.3% to 6.5%, and it is observed that characteristics thereof are improved by approximately 10% to 67% compared to that in the comparative example.

Meanwhile, that |TCR|=3.9% in the comparative example represents a large value compared to that |TCR|=1.6% (refer to JP-A-9-257565) in the related art. Thus, according to the infrared sensor of the examples, it is found that higher sensitivity can be realized, even compared to the comparative example for which it is said that the sensitivity is better than that of the related art.

In addition, as represented in Table 1, it is found that the activation energy of 0.39 eV to 0.67 eV in the examples 1 to 11 is approximately 0.06 eV to 0.34 eV greater than 0.33 eV in the comparative example. Thus, it is found that the infrared sensor of the examples 1 to 11 is great in temperature dependence of the amount of current and high in detection accuracy of the resistance value, compared to that of the comparative example, and thereby the infrared sensor with a higher sensitivity can be realized.

In addition, it is found that the current density of $2.4 \times 10^{-6}$ Acm$^{-2}$ to $1.1 \times 10^{-2}$ Acm$^{-2}$ in the examples 1 to 11 is much greater than $5.6 \times 10^{-7}$ Acm$^{-2}$ in the comparative example. Thus, it is found that the infrared sensor of the examples 1 to 11 is great in temperature dependence of current density and high in detection accuracy of the resistance value, compared to that of the comparative example, and thereby the infrared sensor with a higher sensitivity can be realized.

Figure 7:
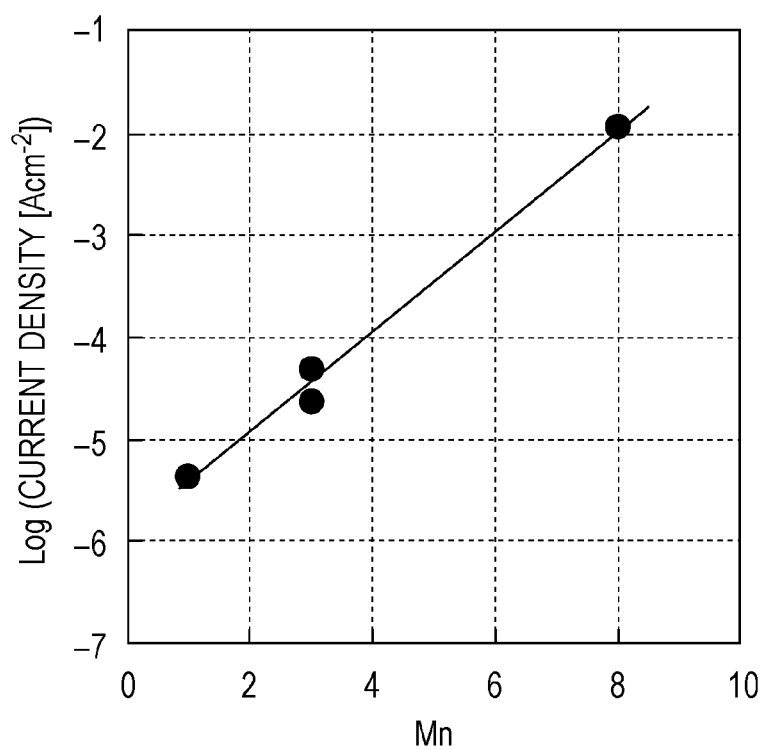
FIG. 7 is a diagram illustrating a relationship between a current density and an amount of Mn of examples 1 to 2 and 7 to 8.

Then, FIG. 7 illustrates a relationship between a current density in 1 V and a content of Mn, in the heat sensing element (examples 1 to 2 and 7 to 8) in which Ti is not included in the B-site element of the perovskite structure.

As illustrated in FIG. 7, it is found that if the logarithm of the current density performs a linear response to the amount of Mn and the amount of Mn increases, the detection sensitivity increases. Particularly, it is confirmed that if an amount of material of Mn which is included in the B-site element is equal to or more than 2 mol %, a current equal to or more than $1 \times 10^{-5}$ Acm$^{-2}$ flows, and thereby a detection with high sensitivity can be accomplished.

Figure 8:
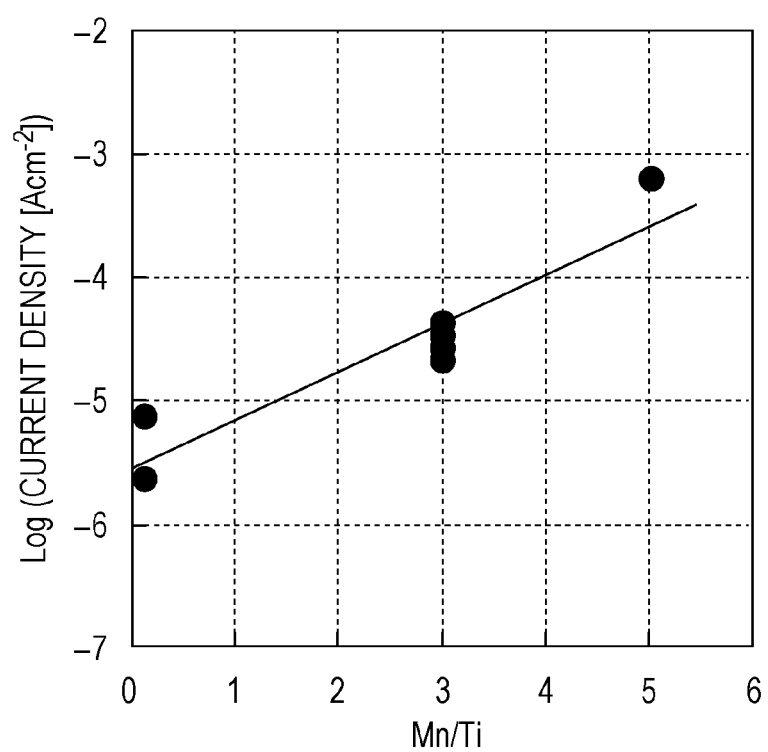
FIG. 8 is a diagram illustrating a relationship between a current density and Mn/Ti of examples 3 to 6 and 9 to 11.

On the other hand, in the heat sensing element (examples 3 to 6 and 9 to 11) in which Ti is included in the B-site element of the composite oxide having the perovskite structure, as illustrated in FIG. 8, the logarithm of the current density performs the linear response to the elemental material amount ratio Mn/Ti of Mn and Ti which are included in the B-site element. Consequently, it is confirmed that if the elemental material amount ratio Mn/Ti increases, the detection sensitivity increases, particularly, if the elemental material amount ratio Mn/Ti is equal to or more than 1.5, the current equal to or more than $1 \times 10^{-5}$ Acm$^{-2}$ flows, and thereby the detection with the high sensitivity can be accomplished.

Other Example

The heat sensing element according to the embodiments of the invention represents a good pyroelectric characteristic, and accordingly can also be used for a pyroelectric device. For example, the heat sensing element can also be used for a thermal-electric converter, an infrared detector, a terahertz detector, a temperature sensor or the like.

The invention can be used even in an industrial field of the infrared sensor and the heat sensing element.

The entire disclosure of Japanese Patent Application No. 2013-062266, filed Mar. 25, 2013 is incorporated by reference herein.

What is claimed is:

1. An infrared sensor, comprising:
a heat sensing element, the heat sensing element including:
a first electrode,
a second electrode, and
a dielectric film formed between the first electrode and the second electrode, wherein the dielectric film includes at least Bi and Fe,
wherein the heat sensing element is configured to sense heat based on a change of a resistance value of the dielectric film in response to the heat, the dielectric film is a composite oxide that has a perovskite structure, and includes Mn in a B-site element, and a material amount ratio of the Mn included in the B-site element is equal to or more than 2 mol %.

2. The infrared sensor according to claim 1,
wherein an absolute value of a temperature coefficient of resistance of the dielectric film is equal to or more than 4%.

3. The infrared sensor according to claim 1,
wherein activation energy of the dielectric film is equal to or more than 0.39 eV.

4. The infrared sensor according to claim 1, wherein Ti is included in the B-site element.

5. The infrared sensor according to claim 4,
wherein an elemental material amount ratio Mn/Ti of the Mn and the Ti which are included in the B-site element, is equal to or more than 1.5.

6. The infrared sensor according to claim 1,
wherein a density of a current flowing in the heat sensing element is equal to or more than $2.4 \times 10^{-6}$ Acm$^{-2}$ and equal to or less than $1.1 \times 10^{-2}$ Acm$^{-2}$.

7. The infrared sensor according to claim 1,
wherein the composite oxide is being expressed in one of the following formulas:

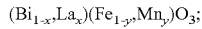

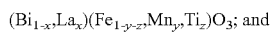

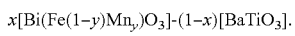

8. A heat sensing element that senses heat, the heat sensing element comprising:
- a first electrode;
- a second electrode; and
- a dielectric film formed between the first electrode and the second electrode, the dielectric film includes at least Bi and Fe,
- wherein the heat is sensed based on a change of a resistance value of the dielectric film, the dielectric film is a composite oxide that has a perovskite structure, and includes Mn in a B-site element, and a material amount ratio of the Mn included in the B-site element is equal to or more than 2 mol %.

9. The heat sensing element according to claim 8, wherein the dielectric film is a composite oxide that has a perovskite structure, the composite oxide is being expressed in one of the following formulas:

$(Bi_{1-x},La_x)(Fe_{1-y},Mn_y)O_3;$ $(Bi_{1-x},La_x)(Fe_{1-y-z},Mn_y,Ti_z)O_3;$ and $x[Bi(Fe(1-y)Mn_y)O_3]-(1-x)[BaTiO_3].$ 10. The heat sensing element according to claim 8, wherein an absolute value of a temperature coefficient of resistance of the dielectric film is equal to or more than 4%.

11. The heat sensing element according to claim 8, wherein activation energy of the dielectric film is equal to or more than 0.39 eV.

12. The heat sensing element according to claim 8, wherein a density of a current flowing in the heat sensing element is equal to or more than $2.4\times10^{-6}$ Acm$^{-2}$ and equal to or less than $1.1\times10^{-2}$ Acm$^{-2}$.

13. A heat sensing element that senses heat, the heat sensing element comprising:
- a first electrode;
- a second electrode; and
- a dielectric film formed between the first electrode and the second electrode, the dielectric film includes at least Bi and Fe, wherein the heat is sensed based on a change of a resistance value of the dielectric film, the dielectric film is a composite oxide that has a perovskite structure, and includes Mn in a B-site element, Ti is included in the B-site element, and an elemental material amount ratio Mn/Ti of the Mn and the Ti which are included in the B-site element, is equal to or more than 1.5.

14. The heat sensing element according to claim 13, wherein an absolute value of a temperature coefficient of resistance of the dielectric film is equal to or more than 4%.

15. The heat sensing element according to claim 13, wherein activation energy of the dielectric film is equal to or more than 0.39 eV.

16. The heat sensing element according to claim 13, wherein a density of a current flowing in the heat sensing element is equal to or more than $2.4\times10^{-6}$ Acm$^{-2}$ and equal to or less than $1.1\times10^{-2}$ Acm$^{-2}$.

17. The heat sensing element according to claim 13, wherein the dielectric film is a composite oxide that has a perovskite structure, the composite oxide is being expressed in one of the following formulas:

$(Bi_{1-x},La_x)(Fe_{1-y},Mn_y)O_3;$ $(Bi_{1-x},La_x)(Fe_{1-y-z},Mn_y,Ti_z)O_3;$ and $x[Bi(Fe_{(1-y)}Mn_y)O_3]-(1-x)[BaTiO_3].$

* * * * *